(12) United States Patent
Kanamaru et al.

(10) Patent No.: US 7,687,573 B2
(45) Date of Patent: Mar. 30, 2010

(54) WATER-DISPERSIBLE POLYOLEFIN RESIN COMPOSITION

(75) Inventors: Masami Kanamaru, Chiba (JP); Yutaka Minami, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 33 days.

(21) Appl. No.: 11/913,105

(22) PCT Filed: Mar. 22, 2006

(86) PCT No.: PCT/JP2006/305731
§ 371 (c)(1),
(2), (4) Date: Oct. 30, 2007

(87) PCT Pub. No.: WO2007/000841
PCT Pub. Date: Jan. 4, 2007

(65) Prior Publication Data
US 2009/0082521 A1    Mar. 26, 2009

(30) Foreign Application Priority Data
Jun. 29, 2005    (JP)    ............................. 2005-189463

(51) Int. Cl.
*C08F 10/06*    (2006.01)
*A61K 9/16*    (2006.01)

(52) U.S. Cl. ...................... 524/583; 524/543

(58) Field of Classification Search ................. 524/583
See application file for complete search history.

(56) References Cited

U.S. PATENT DOCUMENTS 6,800,706 B1 * 10/2004 Kanamaru et al. .......... 526/160

2005/0124753 A1 * 6/2005 Ashihara et al. ............ 524/543

FOREIGN PATENT DOCUMENTS

| EP | 1 500 680 A1 | 1/2005 |
| JP | 4-342728 | 11/1992 |
| JP | 9-502216 | 3/1997 |
| JP | 2000-344972 | 12/2000 |
| JP | 2001-172325 | 6/2001 |
| JP | 2003-261724 | 9/2003 |
| WO | 03/091330 | 11/2003 |

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

Provided is a water dispersible polyolefin resin composition which is capable of forming a coating film having a smooth solidified surface when applied onto a substrate and which has excellent storage stability. The water dispersible polyolefin resin composition contains (C) a surfactant, (D) a water-soluble polymeric compound and (E) a water-insoluble organic solvent in amounts of 0.01 to 1.00 part by mass, 0.01 to 1.00 part by mass and 2 to 200 parts by mass, respectively, per 100 parts by mass of a combination of 5 to 70% by mass of (A) a poly(1-butene) resin having (i) a mesopentad fraction [mmmm] of 20 to 80 mole % and (ii) a weight average molecular weight (Mw) measured by gel permeation chromatography (GPC) of 10,000 to 1,000,000 or 5 to 70% by mass of (A') polypropylene resin having (i) a mesopentad fraction [mmmm] of 20 to 60 mole % and (ii) an intrinsic viscosity [η] measured at 135° C. in tetralin of 0.1 to 15 dl/g with 95 to 30% by mass of (B) water.

8 Claims, No Drawings

WATER-DISPERSIBLE POLYOLEFIN RESIN COMPOSITION

TECHNICAL FIELD

The present invention relates to a water dispersible polyolefin resin composition and, more specifically, to a water dispersible polyolefin resin composition which is capable of forming a coating film having a smooth solidified surface when applied onto a substrate and which has excellent storage stability.

BACKGROUND ART

Polyolefin resins are hitherto available on the marketplace in the form of powder or pellets. When a polyolefin resin in such a state is used to form a film on a surface of a substrate by coating or the like method, it is necessary to use a thermoforming machine such as an extruder or a laminator. Thus, the polyolefin resin when coated in a melted state must be melted and kneaded. This not only brings about a need for a great energy but also causes a problem that the physical properties of the polyolefin resin are affected as a result of the kneading.

In this circumstance, a coating method in which a coating liquid containing a polyolefin resin dissolved in an organic solvent is used has been considered. When this method is performed using a coating liquid having a higher polyolefin resin concentration, however, the coatability thereof is deteriorated and the film thickness is apt to be non-uniform due to an increase of the viscosity thereof. When the polyolefin resin concentration is reduced, on the other hand, there arises a problem that the coating operation must be repeated a number of times in order to obtain a desired film thickness.

As a method to solve the above problems, a thought may occur to use a dispersed liquid, obtained by dispersing a polyolefin resin in water in the form of fine particulates, for coating. By applying and drying such a dispersed liquid onto a surface of a plastic, paper, metal or the like substrate using a generally employed coater, printer or sprayer, it is possible to impart water resistance, chemical resistance and oil resistance to the substrate. Further, the dispersed liquid may be used as a heat sealing material. Thus, using a polyolefin resin in the form of a dispersed liquid, it is possible to easily form a polyolefin resin film over a surface of a substrate.

It is, however, not easy to disperse fine particulates of a polyolefin resin in water. For example, an aqueous emulsion containing a polyolefin derivative, an emulsifier and a water-insoluble organic solvent and a method for producing the aqueous emulsion are disclosed (see, for example, Patent Document 1). As the polyolefin derivative, specifically used is a hydrogen-added derivative of a hydroxyl group-containing conjugated diene polymer, though a polypropylene is exemplified. Since such a hydrogen-added derivative is produced by a two-stage process including polymerization of a diene compound followed by hydrogen-addition of the obtained polymer, the productivity thereof cannot be said to be high. Further, in order to solidify a coated film, it is necessary to add a curing agent to the aqueous emulsion and to heat the coated film for curing same.

A technique in which a polypropylene wax is used in lieu of the above-described hydroxyl group-containing conjugated diene polymer (see, for example, Patent Document 2). In particular, Patent Document 2 discloses an aqueous polyolefin wax dispersion liquid containing a polypropylene wax having a specific average particle diameter and a specific acid value, and a specific glyceride of a specific unsaturated monocarboxylic acid. This technique, however, has a problem with respect to the smoothness of the coated film because the polypropylene wax is present as a solid in the dispersion.

Incidentally, a low crystalline polyolefin (see, for example, Patent Documents 3 and 4) may be used for surface modification of a highly crystalline polypropylene film. When the low crystalline polyolefin is used for surface modification of a highly crystalline polypropylene film, however, it is necessary to dissolve a polymer of the low crystalline polyolefin in an organic solvent. Thus, there is an increasing demand for an aqueous paint which does not adversely affect the environment and which is harmless to the operators.

[Patent Document 1]
Japanese Patent Application Publication No. 2003-261724
[Patent Document 2]
Published Japanese Translation of PCT Application No. H09-502216
[Patent Document 3]
Japanese Patent Application Publication No. 2001-172325
[Patent Document 4]
Japanese Patent Application Publication No. 2001-172325

DISCLOSURE OF THE INVENTION

Problems to be Solved by the Invention

The present invention has been made in view of the above problems and has as its object the provision of a water dispersible polyolefin resin composition which is capable of forming a coating film having a smooth solidified surface when applied onto a substrate and which has excellent storage stability.

Means for Solving the Problems

As a result of an earnest study, the present inventors have found that the above object is fulfilled by a resin composition containing specific amounts of a poly(1-butene) resin being a low crystalline polyolefin resin and having specific properties or a polypropylene resin having specific properties, water, a surfactant, a water-soluble polymeric compound and a water-insoluble organic solvent. The present invention has been completed based on such a finding.

Thus, the present invention provides the following water dispersible polyolefin resin compositions.

1. A water dispersible polyolefin resin composition comprising:
a combination of 5 to 70% by mass of (A) a poly(1-butene) resin having (i) a mesopentad fraction [mmmm] of 20 to 80 mole % and (ii) a weight average molecular weight (Mw) measured by gel permeation chromatography (GPC) of 10,000 to 1,000,000 with 95 to 30% by mass of (B) water;
(C) a surfactant in an amount of 0.01 to 1.00 part by mass per 100 parts by mass of said combination,
(D) a water-soluble polymeric compound in an amount of 0.01 to 1.00 part by mass per 100 parts by mass of said combination; and
(E) a water-insoluble organic solvent in an amount of 2 to 200 parts by mass per 100 parts by mass of said combination.

2. A water dispersible polyolefin resin composition comprising:
a combination of 5 to 70% by mass of (A) a polypropylene resin having (i) a mesopentad fraction [mmmm] of 20 to 60 mole % and (ii) an intrinsic viscosity [η] measured at 135° C. in tetralin of 0.1 to 15 dl/g with 95 to 30% by mass of (B) water;

(C) a surfactant in an amount of 0.01 to 1.00 part by mass per 100 parts by mass of said combination, (D) a water-soluble polymeric compound in an amount of 0.01 to 1.00 part by mass per 100 parts by mass of said combination, and (E) a water-insoluble organic solvent in an amount of 2 to 200 parts by mass per 100 parts by mass of said combination.

3. A water dispersible polyolefin resin composition as defined in 1 above, wherein said composition is obtained by mixing a blend (I) of the component (A) and the component (E) with a blend (II) of the component (B), the component (C) and the component (D).

4. A water dispersible polyolefin resin composition as defined in 3 above, wherein said mixing of the blend (I) with the blend (II) is carried out at a temperature in the range of from 0 to 90° C.

5. A water dispersible polyolefin resin composition as defined in 2 above, wherein said composition is obtained by mixing a blend (I') of the component (A') and the component (E) with a blend (II) of the component (B), the component (C) and the component (D).

6. A water dispersible polyolefin resin composition as defined in 5 above, wherein said mixing of the blend (I') with the blend (II) is carried out at a temperature in the range of from 0 to 90° C.

EFFECT OF THE INVENTION

The present invention enables to obtain a water dispersible polyolefin resin composition which is capable of forming a coating film having a smooth solidified surface when applied onto a substrate and which has excellent storage stability.

BEST MODE FOR CARRYING OUT THE INVENTION

The poly(1-butene) resin, which is the component (A) of the water dispersible polyolefin resin composition of the present invention (hereinafter occasionally referred to simply as "water dispersible composition"), is a low crystalline polyolefin resin having (i) a mesopentad fraction [mmmm] of 20 to 80 mole % and (ii) a weight average molecular weight (Mw) measured by gel permeation chromatography (GPC) of 10,000 to 1,000,000.

When the mesopentad fraction [mmmm] of the poly(1-butene) resin of the component (A) is 80 mole % or less, the resin can be easily mixed with water to form the water dispersible composition having excellent storage stability. When the mesopentad fraction is 20 mole % or more, a coating film obtained by applying the water dispersible composition onto a substrate, followed by drying hardly causes blocking.

It is preferred that the poly(1-butene) resin of the component (A) further satisfy the conditions (a) and (b) given below, since a coating film obtained by applying the water dispersible composition onto a substrate, followed by drying hardly causes blocking:

$[mmmm]/([mmrr]+[rmmr]) \leq 20$ (a)

$[mmmm] \leq 90-2 \times [rr]$. (b)

The weight average molecular weight (Mw) of the poly(1-butene) resin of the component (A) as measured by gel permeation chromatography (GPC) must be 10,000 to 1,000,000, preferably 10,000 to 500,000. When the Mw is 10,000 or more, a coating film obtained by applying the water dispersible composition of the present invention onto a substrate, followed by drying hardly causes blocking. When the Mw is 1,000,000 or less, the water dispersible composition obtained has excellent storage stability.

In the present invention, the mesopentad fraction [mmmm] of the poly(1-butene) resin was determined in accordance with the method proposed in "Polymer Journal, 16, 717 (1984)" reported by Asakura et al, "Macromol. Chem. Phys., C29, 201 (1989)" reported by J. Randall et al, and "Macromol. Chem. Phys., 198, 1257 (1997)" reported by V. Busico et al. Namely, signals attributed to the methylene group and methyne group were measured using $^{13}C$ nuclear magnetic resonance spectroscopy to determine the mesopentad fraction in the molecular of the poly(1-butene) resin. The stereoregularity index ([mmmm]/[mmrr]+[rmmr]) was calculated by measuring [mmmm], [mmrr] and [rmmr] by the above method. The racemic triad fraction [rr] was also calculated by the above method.

The $^{13}C$ nuclear magnetic resonance spectrum was measured using the following apparatus and conditions:

Apparatus: $^{13}C$-NMR spectrometer Model JNM-EX400 manufactured by JEOL Ltd.

Method: Proton complete decoupling method

Concentration: 230 mg/mL

Solvent: 90:10 (by volume) mixed solvent of 1,2,4-trichlorobenzene and deuterated benzene Temperature: 130° C.

Pulse width: 45°

Pulse frequency: 4 seconds

Number of integration: 10,000

The weight average molecular weight Mw was a polystylene converted value determined by GPC method using the following apparatus and conditions:

GPC Apparatus:
  Column: TOSO GMHHR-H(S) HT
  Detector: RI detector for liquid chromatography, WATERS 150C Measurement Conditions:
  Solvent: 1,2,4-trichlorobenzene
  Measuring temperature: 145° C.
  Flow rate: 1.0 mL/minute
  Sample concentration: 2.2 mg/mL
  Injected amount: 160 μL
  Calibration curve: Universal Calibration
  Analysis program: HT-GPC (Ver. 1.0)

The poly(1-butene) resin of the component (A) used in the present invention may be 1-butene homopolymer or 1-butene copolymer. The 1-butene copolymer is a copolymer of 1-butene with ethylene and/or a $C_3$ to $C_{20}$ α-olefin other than 1-butene and is preferably a copolymer of 1-butene with a $C_3$ to $C_{20}$ α-olefin other than 1-butene.

The 1-butene copolymer used in the present invention is preferably a random copolymer. The 1-butene copolymer preferably has at least 90 mole %, more preferably at least 95 mole %, of structural units derived from 1-butene. When the content of structural units derived from 1-butene is 90 mole % or more, a molding obtained is free of surface stickiness and the transparency thereof is not deteriorated.

As the method for producing 1-butene homopolymer and 1-butene copolymer used in the present invention, there may be mentioned a method in which 1-butene is homopolymerized or 1-butene is copolymerized with ethylene and/or an α-olefin having 3 to 20 carbon atoms (except 1-butene) using a catalyst system called metallocene catalyst. As the metallocene catalyst, there may be mentioned catalysts obtained by combining a promoter with a transition metal compound having one or two ligands, such as a cyclopentadienyl group, a substituted cyclopentadienyl group, an indenyl group and a substituted indenyl group or a transition metal compound in which the above ligand or ligands are geometrically controlled, as described in Japanese Patent Application Publication Nos. S58-19309, S61-130314, H03-163088, H04-300887 and H04-211694 and Published Japanese Translation of PCT Application No. H01-502036.

Among metallocene catalysts, the catalysts including a transition metal compound in which the ligands form a cross-linked structure through a cross-linking group are preferred over those without such a cross-linked structure from the standpoint of higher polymerization activity. Particularly preferred is a method in which 1-butene is homopolymerized or 1-butene is copolymerize with ethylene and/or an α-olefin having 3 to 20 carbon atoms (except 1-butene) using a metallocene catalyst obtained by combining a promoter with a transition metal compound having a cross-linked structure through two cross-linking groups. Specific examples of such a preferred method include a method in which 1-butene is homopolymerized or 1-butene is copolymerized with ethylene and/or an □-olefin having 3 to 20 carbon atoms (except 1-butene) in the presence of polymerization catalyst containing (a) a transition metal compound represented by the general formula (I) and (b) at least one component selected from (b-1) a compound capable of reacting with the transition metal compound (a) or its derivative to form a complex and (b-2) aluminoxane.

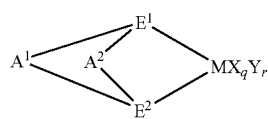

(I)

In the above formula, M represents a metal element belonging to the Groups 3 to 10 or the lanthanoid series of the Periodic Table, $E^1$ and $E^2$, which may be the same or different, each represent a ligand selected from the group consisting of a substituted cyclopentadienyl group, an indenyl group, a substituted indenyl group, a heterocyclopentadienyl group, a substituted heterocyclopentadienyl group, an amide group, a phosphide group, a hydrocarbon group and a silicon-containing group and form a cross-linked structure with $A^1$ and $A^2$, X represents a σ bonding ligand and may be cross-linked with other X, $E^1$, $E^2$ or Y, with the proviso that when there are a plurality of such X groups, they may be the same or different, Y represents a Lewis base and may be cross-linked with other Y, $E^1$, $E^2$ or X, with the proviso that when there are a plurality of such Y groups, they may be the same or different, $A^1$ and $A^2$, which may be the same or different, are each a divalent cross-linking group bonding two ligands and each represent a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, where $R^1$ represents a hydrogen atom, a halogen atom, a $C_1$ to $C_{20}$ hydrocarbon group or a $C_1$ to $C_{20}$ halogen-containing hydrocarbon group, q is an integer of 1 to 5 and represents [(valence of M)−2], and r is an integer of 0 to 3.

In the general formula (I) above, M represents a metal element belonging to the Groups 3 to 10 or the lanthanoid series of the Periodic Table and may be, for example, titanium, zirconium, hafnium, yttrium, vanadium, chromium, manganese, nickel, cobalt, palladium, and metals of the lanthanide series. Above all, titanium, zirconium and hafnium are preferred from the standpoint of the olefin polymerization activity.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group [>CR—, >C<] and a silicon containing group [>SiR—, >Si<] (wherein R represents hydrogen or a $C_1$ to $C_{20}$ hydrocarbon group or a heteroatom containing group), and form a cross-linked structure through $A^1$ and $A^2$. $E^1$ and $E^2$ may be the same or different. As $E^1$ and $E^2$, a substituted cyclopentadienyl group, an indenyl group and a substituted indenyl group are preferred for reasons of the higher polymerization activity.

X represents a σ bonding ligand and may be cross-linked with other X, $E^1$, $E^2$ or Y, with the proviso that when there are a plurality of such X groups, they may be the same or different from each other. Specific examples of the group X include a halogen atom, a $C_1$ to $C_{20}$ hydrocarbon group, a $C_1$ to $C_{20}$ alkoxy group, a $C_6$ to $C_{20}$ aryloxy group, a $C_1$ to $C_{20}$ amide group, a $C_1$ to $C_{20}$ silicon containing group, a $C_1$ to $C_{20}$ phosphide group, a $C_1$ to $C_{20}$ sulfide group and a $C_1$ to $C_{20}$ acyl group.

On the other hand, Y represents a Lewis base. When there are a plurality of such Y groups, they may be the same or different. Y may be cross-linked with other Y, $E^1$, $E^2$ or X. Specific examples of the Lewis base of Y include amines, ethers, phosphines and thioethers.

$A^1$ and $A^2$, which may be the same or different, are each a divalent cross-linking group bonding two ligands and each represent a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, where $R^1$ represents a hydrogen atom, a halogen atom, a $C_1$ to $C_{20}$ hydrocarbon group or a $C_1$ to $C_{20}$ halogen-containing hydrocarbon group. As such a cross-linking group, there may be mentioned a group represented by the following general formula.

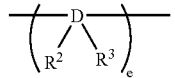

In the above formula, D represents carbon, silicon, germanium or tin, $R^2$ and $R^3$, which may be the same or different, each represent a hydrogen atom or a $C_1$ to $C_{20}$ hydrocarbon group or are taken together to form a cyclic structure, and e is an integer of 1 to 4. Specific examples of the group D include a methylene group, an ethylene group, an ethylidene group, a propylidene group, an isopropylidene group, a cyclohexylidene group, a 1,2-cyclohexylene group, a vinylidene group (CH$_2$=C=), a dimethylsilylene group, a diphenylsilylene group, a methylphenylsilylene group, a dimethylgermilene group, a dimethylstannylene group, a tetramethyldisilylene group and a diphenyldisilylene group. Above all, an ethylene group, an isopropylidene group and a dimethylsilylene group are preferred for reasons of higher polymerization activity.

The symbol q is an integer of 1 to 5 and represents [(valence of M)−2], and r is an integer of 0 to 3.

Among the transition metal compounds represented by the general formula (I), those compounds having a double cross-linked biscyclopentadienyl derivative as a ligand and represented by general formula (II) is preferred.

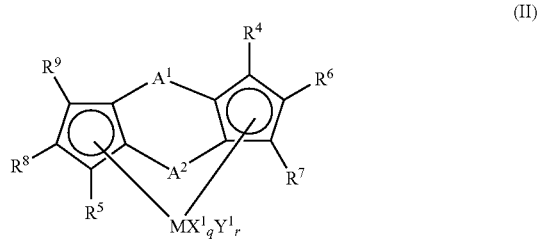

(II)

In above general formula (II), M, $A^1$, $A^2$, q and r are the same as those defined in the general formula (I). $X^1$ represents a σ bonding ligand and may be cross-linked with other $X^1$ or $Y^1$, with the proviso that when there are a plurality of such $X^1$ groups, they may be the same or different. Specific examples of the group $X^1$ are the same as those described for X in the general formula (I). $Y^1$ represents a Lewis base and may be cross-linked with other $Y^1$ or $X^1$ with the proviso that when there are a plurality of such $Y^1$ groups, they may be the same or different. Specific examples of $Y^1$ are the same as those described for Y in the general formula (I).

$R^4$ to $R^9$, which may be the same or different, each represent a hydrogen atom, a halogen atom, a $C_1$ to $C_{20}$ hydrocarbon group, a $C_1$ to $C_{20}$ halogen-containing hydrocarbon group, a silicon-containing group or a hetero atom-containing group with the proviso that at least one of $R^4$ to $R^9$ is not a hydrogen atom. Adjacent two of $R^4$ to $R^9$ may be taken together to form a ring. Especially it is preferred that $R^6$ and $R^7$ be taken together to form a ring, and that $R^8$ and $R^9$ be taken together to form a ring. It is also preferred that $R^4$ and $R^5$ be a group containing a heteroatom such as oxygen, halogen or silicon for reasons of high polymerization activity.

The transition metal compound containing such a double cross-linked biscyclopentadienyl derivative as a ligand preferably contain silicon in the cross-linking group between the ligands.

Specific examples of transition metal compound represented by general formula (I) include: (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)bis(3-methylindenyl)zirconium dichloride, (1,2'-ethylene)(2,1'-ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl)zirconium dichloride, (1,2'-dimethylsilylene)(2,1'-dimethylsilylene)-bis(3-methylindenyl)zirconium dichloride, (1,2'-dimethylsilylene)(2,1'-dimethylsilylene)-bis(3-n-butylindenyl)zirconium dichloride, (1,2'-dimethylsilylene) (2,1'-dimethylsilylene)-bis(3-isopropylindenyl) zirconium dichloride, (1,2'-dimethylsilylene)(2,1'-dimethylsilylene)-bis(3-trimethylsilylmethylindenyl) zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl) zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-diisopropylindenyl)zirconium dichloride, (1,2'-dimethylsilylene)(2,1'-dimethylsilylene)-bis(4-phenylindenyl)zirconium dichloride, (1,2'-dimethylsilylene)(2,1'-dimethylsilylene)-bis(3-methyl-4-isopropylindenyl) zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene) (2,1'-isopropylidene)-bis(3-methylindenyl)zirconium dichloride, (1,2'-dimethylsilylene)(2,1'-isopropylidene)-bis(3-isopropylindenyl)zirconium dichloride, (1,2'-dimethylsilylene)(2,1'-isopropylidene)-bis(3-n-butylindenyl) zirconium dichloride, (1,2'-dimethylsilylene)(2,1'-isopropylidene)-bis(3-trimethylsilylmethylindenyl) zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl) zirconium dichloride, (1,2'-dimethylsilylene)(2,1'-methylene)-bis(3-isopropylindenyl)zirconium dichloride, (1,2'-dimethylsilylene)(2,1'-methylene)-bis(3-n-butylindenyl)zirconium dichloride, (1,2'-dimethylsilylene)(2,1'-methylene)-bis(3-trimethylsilylmethylindenyl)zirconium dichloride, (1,2'-dimethylsilylene)(2,1'-methylene)-bis(3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene)(2,1'-methylene)-bis(3-isopropylindenyl)zirconium dichloride, (1,2'-diphenylsilylene)(2,1'-methylene)-bis(3-n-butylindenyl)zirconium dichloride, (1,2'-diphenylsilylene)(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl) zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl) zirconium dichloride, (1,2'-methylene)(2,1'-methylene)(3-methylcyclopentadienyl)(3'-methylcyclopentadienyl) zirconium dichloride, (1,2'-methylene)(2,1'- isopropylidene)(3-methylcyclopentadienyl)(3'-methylcyclopentadienyl)zirconium dichloride,
(1,2'-isopropylidene)(2,1'-isopropylidene) (3-methylcyclopentadienyl)(3'-methylcyclopentadienyl)zirconium dichloride, (1,2'-dimethylsilylene)(2,1'-dimethylsilylene) (3,4-dimethylcyclopentadienyl)(3'4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl) zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride,
(1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3'4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene) (2,1'-dimethylsilylene)(3-methyl-5-phenylcyclopentadienyl)(3'-methyl-5'-phenylcyclopentadienyl)zirconium dichloride,
(1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-isopropylcyclopentadienyl)(3'-methyl-5'-isopropylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-isopropylcyclopentadienyl)(3'-methyl-5'-isopropylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride,
(1,2'-dimethylsilylene)(2,1'-ethylene)(3-methyl-5-phenylcyclopentadienyl)-(3'-methyl-5'-phenylcyclopentadienyl) zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-isopropylcyclopentadienyl)(3'-methyl-5'-isopropylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-isopropylcyclopentadienyl)(3'-methyl-5'-isopropylcyclopentadienyl)zirconium dichloride, (1,2'-ethylene)(2,1'-isopropylidene)(3-methyl-5-isopropylcyclopentadienyl)(3'-methyl-5'-isopropylcyclopentadienyl)zirconium dichloride,
(1,2'-methylene)(2,1'-methylene)(3-methyl-5-isopropylcyclopentadienyl)(3'-methyl-5'-isopropylcyclopentadienyl) zirconium dichloride, (1,2'-methylene)(2,1'-isopropylidene)(3-methyl-5-isopropylcyclopentadienyl)(3'-methyl-5'-isopropylcyclopentadienyl)zirconium dichloride, (1,1'-dimethylsilylene)(2,2'-dimethylsilylene)-bis(indenyl)zirconium dichloride, (1,1'-diphenylsilylene)(2,2'-dimethylsilylene)-bis(indenyl)zirconium dichloride, (1,1'-dimethylsilylene)(2,1'-dimethylsilylene)-bis(indenyl)zirconium dichloride, (1,1'-diisopropylsilylene)(2,2'-dimethylsilylene)-bis(indenyl)zirconium dichloride, (1,1'-dimethylsilylene)(2,2'-diisopropylsilylene)-bis(indenyl) zirconium dichloride, (1,1'-dimethylsilyleneindenyl)(2,2'-dimethylsilylene-3-trimethylsilylindenyl)zirconium dichloride, (1,1'-diphenylsilyleneindenyl)(2,2'-diphenylsilylene-3-trimethylsilylindenyl)zirconium dichloride, (1,1'-diphenylsilyleneindenyl)(2,2'-dimethylsilylene-3-trimethylsilylindenyl)zirconium dichloride,
(1,1'-dimethylsilyleneindenyl)(2,2'-diphenylsilylene-3-trimethylsilylindenyl)zirconium dichloride, (1,1'-diisopropylsilyleneindenyl)(2,2'-dimethylsilylene-3-trimethylsilylindenyl)zirconium dichloride, (1,1'-dimethylsilyleneindenyl)(2,2'-diisopropylsilylene-3-trimethylsilylindenyl)zirconium dichloride, (1,1'-diisopropylsilyleneindenyl)(2,2'-diisopropylsilylene-3-trimethylsilylindenyl)zirconium dichloride, (1,1'-dimethylsilyleneindenyl)(2,2'-dimethylsilylene-3-trimethylsilylmethylindenyl)zirconium dichloride, (1,1'-diphenylsilyleneindenyl)(2,2'-diphenylsilylene-3-trimethylsilylmethylindenyl)zirconium dichloride, (1,1'-diphenylsilyleneindenyl)(2,2'-dimethylsilylene-3-trimethylsilylmethylindenyl)zirconium dichloride, (1,1'-dimethylsilyleneindenyl)(2,2'-diphenylsilylene-3-trimethylsilylmethylindenyl)zirconium dichloride,
(1,1'-diisopropylsilyleneindenyl)(2,2'-dimethylsilylene-3-trimethylsilylmethylindenyl)-zirconium dichloride, (1,1'-dimethylsilyleneindenyl)(2,2'-diisopropylsilylene-3-trimethylmethylsilylindenyl)zirconium dichloride, (1,1'-diisopropylsilyleneindenyl)(2,2'-diisopropylsilylene-3-trimethylmethylsilylindenyl)zirconium dichloride, and compounds in which the zirconium of the above compounds is substituted with titanium or hafnium. It is without saying that the transition metal compounds are not limited to the above examples. They may be analogous compounds containing metals of other Groups or of lanthanoide series. Further, in the above compounds, (1,1'-)(2,2'-) may be replaced by (1,2'-)(2,1'-), and (1,2'-)(2,1'-) may be by (1,1'-)(2,2'-).

Next, as the compound (b-1) of the component (b), though any compound capable of forming an ionic complex by reacting with a transition metal compound of the component (a) described above may be employed, a compound represented by the following general formulas (III) or (IV) is preferably used:

$$([L^1-R^{10}]^{k+})_a([Z]^-)_b \qquad (III)$$

$$([L^2]^{k+})_a([Z]^-)_b \qquad (IV)$$

(wherein $L^2$ represents $M^2$, $R^{11}R^{12}M^3$, $R^{13}{}_3C$ or $R^{14}M^3$)

In the formulas (III) and (IV), $L^1$ represents a Lewis base, $[Z]^-$ represents a non-coordinating anion $[Z^1]^-$ or $[Z^2]^-$, wherein $[Z^1]^-$ represents an anion in which plural groups are bonded to a chemical element, that is, $[M^1G^1G^2 \ldots G^f]^-$ (where $M^1$ represents a chemical element belonging to the Groups 5 to 15, preferably the Groups 13 to 15, of the Periodic Table, and $G^1$ to $G^f$ each represents a hydrogen atom, a halogen atom, a $C_1$ to $C_{20}$ alkyl group, a $C_2$ to $C_{40}$ dialkylamino group, a $C_1$ to $C_{20}$ alkoxy group, a $C_6$ to $C_{20}$ aryl group, a $C_6$ to $C_{20}$ aryloxy group, a $C_7$ to $C_{40}$ alkylaryl group, a $C_7$ to $C_{40}$ arylalkyl group, a $C_1$ to $C_{20}$ halogen substituted hydrocarbon group, a $C_1$ to $C_{20}$ acyloxy group, an organic metalloid group, or a $C_2$ to $C_{20}$ heteroatom containing hydrocarbon group, or two or more of $G^1$ to $G^f$ may be taken together to form a ring, and f is an integer of [(valence of center metal $M^1$)+1]), and $[Z^2]^-$, which may be coordinated by a Lewis base, represents a conjugate base of a Bronsted acid alone, of which a logarithm of an inverse number of the acid dissociation constant, pKa, is −10 or less, or of a combination of the Bronsted acid with a Lewis acid, or a conjugate base of an acid which is generally defined as a super strong acid, $R^{10}$ represents a hydrogen atom, a $C_1$ to $C_{20}$ alkyl group or a $C_6$ to $C_2$ aryl, alkylaryl or arylalkyl group, $R^{11}$ and $R^{12}$ each represent a cyclopentadienyl group, a substituted cyclopentadienyl group, an indenyl group or a fluorenyl group, $R^{13}$ represents a $C_1$ to $C_{20}$ alkyl group or an aryl group, an alkylaryl group or an arylalkyl group, $R^{14}$ represents a large cyclic ligand such as tetraphenylporphyrin or phthalocyanine, k is an ionic valence of $[L^1—R^{10}]$ and $[L^2]$ and an integer of 1 to 3, a is an integer of at least 1, b is a number of (k×a), $M^2$ represents an element belonging to Groups 1 to 3, 11 to 13 and 17 of the Periodic Table and $M^3$ represents an element belonging to the Groups 7 to 12 of the Periodic Table.

Specific examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline; phosphines such as triethylphosphine, triphenylphosphine and diphenylphosphine; thioethers such as tetrahydrothiophene; esters such as ethyl benzoate; and nitriles such as acetonitrile and benzonitrile.

Specific examples of $R^{10}$ include hydrogen, a methyl group, an ethyl group, a benzyl group and a trityl group. Specific examples of $R^{11}$ and $R^{12}$ include a cyclopentadienyl group, a methylcyclopentadienyl group, an ethylcyclopentadienyl group and a pentamethylcyclopentadienyl group.

Specific examples of $R^{13}$ include a phenyl group, a p-tolyl group and a p-methoxyphenyl group. Specific examples of $R^{14}$ include tetraphenylporphin, phthalocyanine, aryl and metharyl.

Specific examples of $M^2$ include Li, Na, K, Ag, Cu, Br, I and $I_3$. Specific examples of $M^3$ include Mn, Fe, Co, Ni and Zn.

Specific examples of $M^1$ in $[Z^1]^-$, that is $[M^1G^1G^2 \ldots G^f]$ include B, Al, Si, P, As and Sb, of which B and Al are preferred. Specific examples of $G^1$ and $G^2$ to $G^f$ include a dialkylamino group such as a dimethylamino group and a diethylamino group; an alkoxy or aryloxy group such as a methoxy group, an ethoxy group, an n-butoxy group and a phenoxy group; a hydrocarbon group such as a methyl group, an ethyl group, an n-propyl group, an isopropyl group, an n-butyl group, an isobutyl group, an n-octyl group, an n-eicocyl group, a phenyl group, a p-tolyl group, a benzyl group, a 4-t-butylphenyl group and a 3,5-dimethylphenyl group; a halogen atom such as fluorine, chlorine, bromine and iodine; a heteroatom-containing hydrocarbon groups such as a p-fluorophenyl group, a 3,5-difluorophenyl group, pentachlorophenyl group, a 3,4,5-trifluorophenyl group, a pentafluorophenyl group, a 3,5-bis(trifluoromethyl)phenyl group and a bis(trimethylsilyl)methyl group; an organic metalloid group such as a pentamethylantimony group, a trimethylsilyl group, a trimethylgermyl group, a diphenylarsine group, a dicyclohexylantimony group and a diphenylboron group.

Specific examples of the non-coordinative anion, that is, a conjugate base $[Z^2]^-$ of a Bronsted acid (having a pKa of −10 or less) alone or a combination of the Bronsted acid with a Lewis acid, include a trifluoromethanesulfonic acid anion $(CF_3SO_3)^-$, a bis(trifluoromethanesulfonyl)methyl anion, a bis(trifluoromethanesulfonyl)benzyl anion, bis(trifluoromethanesulfonyl)amide, a perchlorate anion $(ClO_4)^-$, a trifluoroacetic acid anion $(CF_3CO2)^-$, a hexafluoroantimony anion $(SbF_6)^-$, a fluorosulfonic acid anion $(FSO_3)^-$, a chlorosulfonic acid $(ClSO_3)^-$, a fluorosulfonic acid anion/antimony pentafluoride $(FSO_3/SbF_5)^-$, a fluorosulfonic acid anion/arsenic pentafluoride $(FSO_3/AsF_5)^-$ and trifluoromethanesulfonic acid anion/antimony pentafluoride $(CF_3SO_3/SbF_5)^-$.

Specific examples of the ionic compound capable of forming an ionic complex by reaction with a transition metal of the component (a), that is the compound (b-1), include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium, tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl (2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrin manganese tetraphenylborate, ferrocenium tetrakis(pentafluorophenyl)borate, 1,1'-dimethylferrocenium tetrakis(pentafluorophenyl)borate, decamethylferrocenium tetrakis(pentafluorophenyl) borate, silver tetrakis(pentafluorophenyl)borate, trityl tetrakis(pentafluorophenyl)borate, lithium tetrakis(pentafluorophenyl) borate, sodium tetrakis(pentafluorophenyl)borate, tetraphenylporphylin manganese tetrakis(pentafluorophenyl)borate, silver tetrafluoroborate, silver hexafluorophosphate, silver hexafluoroarsenate, silver perchlorate, silver trifluoroacetate and silver trifluoromethanesulfonate. The compounds (b-1) may be used singly or in combination of two or more thereof.

On the other hand, aluminoxane of the component (b-2) may be a linear aluminoxane represented by the general formula (V):

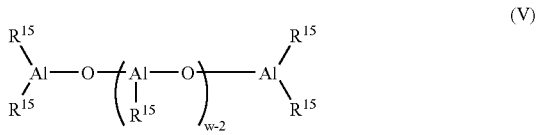

wherein $R^{15}$ represents a $C_1$ to $C_{20}$, preferably $C_1$ to $C_{12}$ hydrocarbon group, such as an alkyl group, an alkenyl group, an aryl group or an arylalkyl group, or a halogen atom with the proviso that when there are a plurality of such $R^{15}$ groups, they may be the same or different, w represents an average polymerization degree, and is generally an integer of 2 to 50, preferably 2 to 40;

or may be a cyclic aluminoxane represented by the general formula (VI):

wherein $R^{15}$ and w are the same as defined above in connection with the above general formula (V).

As a method for the production of the aluminoxane described above, there may be mentioned a process in which an alkylaluminum is brought into contact with a condensing agent such as water. However, the method therefor shall not specifically be restricted, and the reaction may be carried out according to a publicly known process. Specific examples of the method include (1) a process in which a solution of an organic aluminum compound dissolved in an organic solvent is brought into contact with water, (2) a process in which an organic aluminum compound is first added in a polymerization zone and then water is added thereto, (3) a process in which crystal water contained in a metal salt or water adsorbed by an inorganic matter or an organic matter is reacted with an organic aluminum compound and (4) a process in which tetraalkyldialuminoxane is reacted with trialkylaluminum and further reacted with water. A toluene-insoluble aluminoxane may be used if desired. The above aluminoxanes may be used singly or in combination of two or more thereof.

The molar ratio of the catalyst component (a) to the catalyst component (b) is preferably 10:1 to 1:100, more preferably 2:1 to 1:10, in a case where the compound (b-1) is used as the catalyst component (b). When the molar ratio falls within the above range, catalyst cost per unit weight of the polymer is not high and is practically acceptable.

In a case where the compound (b-2) is used, the molar ratio is preferably in the range of 1:1 to 1:1,000,000, more preferably 1:10 to 1:10,000. When the molar ratio falls within the above range, catalyst cost per unit weight of the polymer is not high and is practically acceptable.

As the catalyst component (b), the compounds (b-1) and (b-2) may be used alone or in combination with two or more thereof. The compound (b-1) is preferable as the catalyst component (b) from the standpoint of polymerization activity.

The polymerization catalyst for the production of the poly (1-butene) resin of the present invention may contain an organic aluminum compound as a component (c) in addition to the above components (a) and (b).

As the organic aluminum compound used as the component (c), there may be used a compound represented by the general formula (VII):

wherein, $R^{16}$ represents a $C_1$ to $C_{10}$ alkyl group, J represents a hydrogen atom, a $C_1$ to $C_{20}$ alkoxy group, a $C_6$ to $C_{20}$ aryl group or a halogen atom and v is an integer of 1 to 3.

Specific examples of the compound represented by the above general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride. These organic aluminum compounds may be used alone or in combination of two or more thereof.

In the process for producing the poly(1-butene) resin, the above-described components (a) to (c) may be selectively subjected to a preliminary contact. For example, such a preliminary contact can be carried out by bringing the component (a) into contact with the component compound (b). In this case, the contacting method is not specifically restricted, and publicly known methods can be employed. The above preliminary contact is effective for improving catalyst activity and for reducing the catalyst cost by a reduction of the amount of the component (b) which is a promoter. Further, in addition to the above effect, a molecular weight increasing effect may be obtained by contacting the component (a) and the component (b-2). The preliminary contact is generally carried out at a temperature of $-20°$ C. to $200°$ C., preferably $-10°$ C. to $150°$ C., more preferably $0°$ C. to $80°$ C. In the preliminary contact, an inert hydrocarbon such as an aliphatic hydrocarbon and an aromatic hydrocarbon can be used as a solvent. Among them, the aliphatic hydrocarbon is particularly preferred.

The molar ratio of the catalyst component (a) to the catalyst component (c) is preferably 1:1 to 1:10,000, more preferably 1:5 to 1:2000, still more preferably 1:10 to 1:1,000.

The use of the component (c) can improve the polymerization activity per unit transition metal. Further, when the molar ratio falls within the above range, a waste of the organic aluminum compound can be avoided and the organic aluminum compound does not remain in the α-olefin polymer in a large amount.

The poly(1-butene) resin used in the present invention is produced by homopolymerizing 1-butene or copolymerizing 1-butene with ethylene and/or a $C_3$ to $C_{20}$ α-olefin using the above-described polymerization catalyst.

In this case, the polymerization method is not particularly limited. Any method such as a slurry polymerization method, a gas phase polymerization method, a block polymerization method, a solution polymerization method or a suspension polymerization method may be used. Of these methods, the solution polymerization method is particularly preferred.

As for the polymerization condition, the polymerization temperature is generally $-100$ to $250°$ C., preferably $-50$ to $200°$ C., more preferably 0 to $130°$ C. The amount of the catalyst relative to the raw material is preferably such that the ratio of the raw material monomer to the above component (a) (molar ratio) is preferably 1 to $10^8$, particularly 100 to $10^5$. Further, the polymerization time is normally 5 minutes to 10 hours and the reaction pressure is preferably ambient pressure to 20 MPa (gauge), more preferably ambient pressure to 10 MPa (gauge).

The molecular weight of the polymer may be controlled by suitably selecting the kind and amount of each of the catalyst components and the polymerization temperature and by performing the polymerization in the presence of hydrogen.

A solvent may be used for the polymerization. Examples of the solvent include aromatic hydrocarbons such as benzene, toluene, xylene and ethylbenzene, alicyclic hydrocarbons such as cyclopentane, cyclohexane and methylcyclohexane, aliphatic hydrocarbons such as pentane, hexane, heptane and octane, and halogenated hydrocarbon such as chloroform and dichloromethane. These solvents may be used alone or in combination of two or more thereof. Further, a monomer such as an α-olefin may be used as the solvent. Depending on the polymerization method, no solvent may be used.

The polymerization may be preceded by a preliminary polymerization using the above described polymerization catalyst. The preliminary polymerization can be conducted, for example, by contacting a small amount of an olefin with a solid catalyst component. There is no limitation as to the preliminary polymerization method, and any known process can be employed. The olefin for use in preliminary polymerization is not specifically limited, and the same olefin described above, such as ethylene, a $C_3$ to $C_{20}$ α-olefin or a mixture thereof may be used. It is, however, advantageous to use the same α-olefin as that used in the polymerization.

The preliminary polymerization is generally carried out at a temperature of −20 to 200° C., preferably −10 to 130° C., more preferably 0 to 80° C. A solvent such as an aliphatic hydrocarbon, an aromatic hydrocarbon or a monomer may be used for the preliminary polymerization. Among them, an aliphatic hydrocarbon is particularly preferable. The preliminary polymerization can also be conducted without a solvent.

It is preferred that the preliminary polymerization be performed under such conditions so that the amount of the product of preliminary polymerization is 1 to 10,000 g, particularly 10 to 1,000 g per 1 mmole of the transition metal contained in the catalyst.

The propylene resin of the component (A') used in the water dispersible polyolefin resin composition of the present invention is a low crystalline polyolefin resin having (i) a mesopentad fraction [mmmm] of 20 to 60 mole % and (ii) an intrinsic viscosity [η] of 0.1 to 15 dl/g as measured in a tetralin at 135° C.

When the mesopentad fraction [mmmm] of the polypropylene resin of the component (A') is 60 mole % or less, the resin can be easily mixed with water to form the water dispersible composition having excellent storage stability. When the mesopentad fraction is 20 mole % or more, a coating film obtained by applying the water dispersible composition onto a substrate, followed by drying hardly causes blocking.

It is preferred that the polypropylene resin of the component (A') further satisfy the conditions (a), (b) and (c) given below, since a coating film obtained by applying the water dispersible composition onto a substrate, followed by drying hardly causes blocking:

$[rrrr]/(1-[mmmm]) \leq 0.1$ (a)

$([mm] \times [rr])/[mr]^2 \leq 2.0$ (b)

$[rmrm] > 2.5$ mole % (c)

The mesopentad fraction [mmmm] of the polypropylene resin described herein means a meso fraction in pentad units in the polypropylene molecular chain as measured using signals attributed to the methyl group in $^{13}$C-NMR spectra according to the method proposed by A. Zambelli et al. in "Macromolecules", No. 6, p. 925 (1973).

The $^{13}$C-NMR spectra were measured according to the attribution of peaks as proposed by A. Zambelli et al. in "Macromolecules", No. 8, p. 687 (1975), using the same apparatus and conditions as those used for the measurement of the mesopentad fraction [mmmm] of the poly(1-butene) resin of the component (A). The racemic pentad fraction [rrrr], mesotriad fraction [mm] and racemic triad fractions [rr], [mr] and [rmrm] were also measured in the same manner as above.

The polypropylene resin of the component (A') must have an intrinsic viscosity [η] as measured in a tetralin at 135° C. of 0.1 to 15 dl/g, preferably 0.1 to 5 dl/g. When the intrinsic viscosity [η] is 0.1 dl/g or more, a coating film obtained by applying the water dispersible composition onto a substrate, followed by drying hardly causes blocking. When the intrinsic viscosity is 15 dl/g or less, the water dispersible composition obtained has excellent storage stability.

The polypropylene resin of the component (A') used in the present invention may be a propylene homopolymer or a propylene copolymer. The propylene copolymer is a copolymer of propylene with ethylene and/or a $C_4$ to $C_{20}$ α-olefin.

As a method for producing the propylene homopolymer or propylene copolymer used in the present invention, there may be mentioned a method in which propylene is homopolymerized or propylene is copolymerized with ethylene and/or a $C_4$ to $C_{20}$ α-olefin using a catalyst system called metallocene catalyst. The metallocene catalysts described above in connection with the production of the poly(1-butene) resin of the component (A) may be used. However, among the transition metal compounds represented by the above general formula (I), those having a ligand of a (1,2')(2,1') double cross-linked type are preferred.

The propylene polymer used in the present invention may be produced by homopolymerization of propylene or copolymerization of propylene with ethylene and/or a $C_4$ to $C_{20}$ α-olefin using the above-described polymerization catalyst. The polymerization method, polymerization conditions, amount of the catalyst relative to the reaction raw material, method for controlling the molecular weight of the polymer, examples of polymerization solvent when used, conditions for preliminary polymerization using the above polymerization catalyst, etc. are the same as those in the production of the poly(1-butene) resin of the component (A).

In the water dispersible composition of the present invention, the amount of the poly(1-butene) resin of the component (A) or the polypropylene resin of the component (A') should be 5 to 70% by mass, preferably 10 to 50% by mass, based on a total amount of the component (A) or (A') and water of the component (B). When the amount of the component (A) or component (A') is 5% by mass or more, the water dispersible composition can have a suitable ratio of the resin to the water and, therefore, can be dried within a short period of time after being applied onto a substrate. When the amount of the component (A) or component (A') is 70% by mass or less, the water dispersible composition can exhibit sufficient fluidity and, therefore, can be applied onto a substrate with a high operation efficiency and can give a coating film having a smooth surface.

Water of the component (B) used in the present invention may be purified water, city water or the like water. In the water dispersible composition of the present invention, the amount of water of the component (B) should be 95 to 30% by mass, preferably 90 to 50% by mass, based on a total amount of the component (A) or (A') and the component (B).

As the surfactant of the component (C) used in the present invention, a nonionic surfactant or anionic surfactant is suitably used for reasons of good storage stability of the water dispersible composition. Examples of the nonionic surfactant include polyoxyethylene alkyl ethers and polyoxyethylene alkylphenyl ethers such as polyoxyethylene lauryl ether, polyoxyethylene octylphenyl ether and polyoxyethylene nonylphenyl ether; polyoxyethylenesorbitane fatty acid esters such as polyoxyethylenesorbitane monolaurate and polyoxyethylenesorbitane monooleate; polyoxyethylene polyoxypropylene block copolymers having an ethyleneoxide addition amount of 10 to 80% by mass; and polyalkylene glycol type and fatty acid ester type surfactants.

Examples of the anionic surfactant include sodium laurylsulfate, sodium dodecylbenzenesulfonate, sodium dialkylsulfosuccinate, sodium polyoxyethylene alkyl ether sulfate, sodium polyoxyethylene alkylphenyl ether sulfate, methyltaurinic acid salts, ether-sulfonic acid salts and phosphoric acid ester salts.

If desired, a cationic surfactant such as a quaternary ammonium salt or an amine salt, and an amphoteric surfactant may be also used.

In the water dispersible composition of the present invention, the content of the surfactant of the component (C) should be 0.01 to 1 part by mass, preferably 0.01 to 0.6 part by mass, per 100 parts by mass of a total of the component (A) or (A') and the component (B). When the content of the component (C) is 0.01 part by mass or more, the water dispersible composition obtained has excellent storage stability. When the content of the component (C) is 1 part by mass or less, the water dispersible composition obtained can be used for the desired application without an adverse influence of the surfactant on its performance. For example, when the surfactant is used in an amount of more than 1 part by mass, there is a possibility that a coating film obtained by applying the water dispersible composition onto a substrate, followed by drying causes blocking due to the characteristics of the surfactant.

With regard to the water-soluble polymeric compound of the component (D) used in the present invention, various kinds of water-soluble polymeric compounds may be used as protective colloid. Examples of the protective colloid include poly(meth)acrylic acid salts such as sodium polyacrylate, polyvinyl alcohol, partially saponified polyvinyl alcohol, and fiber derivatives such as methylcellulose and hydroxyethylcellulose.

The polyvinyl alcohol may be, for example, ordinary partially saponified polyvinyl alcohol, completely saponified polyvinyl alcohol, and modified polyvinyl alcohol such as carboxyl group-modified polyvinyl alcohol, silanol group-modified polyvinyl alcohol and acetoacetylated polyvinyl alcohol.

In the water dispersible composition of the present invention, the content of the water-soluble polymeric compound of the component (D) should be 0.01 to 1 part by mass, preferably 0.01 to 0.6 part by mass, per 100 parts by mass of a total of the component (A) or (A') and the component (B). When the content of the component (D) is 0.01 part by mass or more, the water dispersible composition obtained has excellent storage stability. When the content of the component (D) is 1 part by mass or less, the water dispersible composition obtained can be used for the desired application without an adverse influence of the water-soluble polymeric compound on its performance. For example, when the water-soluble polymeric compound is used in an amount of more than 1 part by mass, there is a possibility that a coating film obtained by applying the water dispersible composition onto a substrate, followed by drying causes surface stickiness due to the property of the water-soluble polymeric compound. The water-soluble polymeric compound serves to cover the emulsified particles in the water dispersible composition and to contribute to improve the storage stability of the water dispersible composition.

As the water-insoluble organic solvent of the component (E) used in the present invention, there may be mentioned, for example, a hydrocarbon-type organic solvent such as pentane, hexane, heptane, cyclohexane, methylcyclohexane, toluene, xylene and benzene. From a viewpoint of safety and hygiene, an aliphatic organic solvent such as pentane, hexane, heptane, cyclohexane and methylcyclohexane is preferred.

In the water dispersible composition of the present invention, the content of the water-insoluble organic solvent of the component (E) should be 2 to 200 parts by mass per 100 parts by mass of a total of the component (A) or (A') and the component (B). When the content of the component (E) is 2 parts by mass or more, the water dispersible composition obtained has excellent storage stability. When the content of the component (E) is 200 parts by mass or less, it is easy to dry the applied water dispersible composition and, hence, the operation efficiency can be improved. By compounding the component (E), the component (A) or (A') contained in the water dispersible composition does not easily crystallize. Therefore, a smooth coating film can be obtained by coating the water dispersible composition onto a substrate.

In the water dispersible composition of the present invention, a modified resin obtained by modifying the above component (A) or (A') with an oxygen-containing unsaturated ketone compound, a radical initiator and an organic acid may be used as the component (A) or (A'). Alternatively, the modified resin may be used together with the component (A) or (A'). When such a modified resin is used, a hydroxide compound such as sodium hydroxide or potassium hydroxide may be incorporated into water of the component (B) to neutralize acid matters.

If desired, the water dispersible composition of the present invention may contain additives, such as a pigment, customarily used in water dispersible compositions.

The water dispersible polyolefin resin composition of the present invention may be obtained by mixing components (A), (B), (C), (D) and (E) or (A'), (B), (C), (D) and (E). In this case, the water dispersible polyolefin resin composition may be effectively obtained by mixing a blend (I) of the component (A) and the component (E) or a blend (I') of the component (A) and the component (E) with a blend (II) of the component (B), the component (C) and the component (D). The mixing of the blend (I) or (I') with the blend (II) may be carried out at a temperature of 100° C. or higher under a pressurized condition, but may also be carried out at a temperature in the range of from 0 to 90° C., preferably 25 to 90° C. Even when the mixing is performed at a low temperature of 0 to 90° C., the water dispersible composition obtained can form a coating film having a smooth solidified surface when applied onto a substrate and has excellent storage stability More specifically, the water dispersible composition of the present invention may be produced, for example, by the following methods:

(1) a method for producing the water dispersible polyolefin resin composition wherein the component (A) or (A') is dispersed in water by first dissolving the component (A) or (A') in an organic solvent (component (E)), followed by mixing the resulting solution with an aqueous solution containing the components (B), (C), (D) and, optionally an additive while applying a shearing force thereto; and (2) a method wherein the component (A) or (A') is dissolved in an organic solvent (component (E)) with heating to obtain a solution having a low viscosity, followed by dispersing the resulting solution in an aqueous solution containing the components (B), (C), (D) and, optionally an additive.

As a method for obtaining the water dispersible composition by application of a shearing force, there may be adopted a method in which an extruder is used to heat at a temperature of 50 to 300° C. In this case, since the shearing force can be applied under a pressurized condition, it is possible to use a temperature higher than 100° C. Alternatively, the water dispersible composition may be obtained by stirring the mixture with a homogenizer at a temperature of 0 to 90° C. and a revolution speed of 5,000 to 20,000 rpm for 30 seconds to 2 hours.

The water dispersible polyolefin resin composition of the present invention may be applied onto a surface of a substrate such as a plastic, a paper or a metal using an ordinary coater printer, sprayer or the like. After the application, the coating film is dried by heating at a temperature not higher than the heat resistant temperature of the substrate or by blowing air or nitrogen.

EXAMPLES

The present invention will be next described in more detail below but is not limited thereto in any way.

Preparation Example 1

Production of (1,2'-dimethylsilylene)(2,1'-dimethylsilylene)-bis(3-trimethylsilylmethyl-indenyl)zirconium dichloride In a Schlenk's bottle 3.0 g (6.97 mmole) of a lithium salt of (1,2'-dimethylsilylene) (2,1'-dimethylsilylene)-bis(indene) were dissolved in 50 mL of THF (tetrahydrofuran), and the solution was cooled to −78° C. Then, 2.1 mL (14.2 mmole) of iodomethyltrimethylsilane were slowly added dropwise to the solution, and the mixture was stirred at room temperature for 12 hours.

The resultant reaction solution was distilled to remove the solvent therefrom, to which 50 mL of ether was added. This was then washed with a saturated ammonium chloride solution.

An organic phase separated from the solution was dried and the solvent was removed therefrom to obtain 3.04 g (5.88 mmole) of (1,2'-dimethylsilylene)(2,1'-dimethylsilylene)bis(3-trimethylsilylmethylindene) (yield: 84%).

Next, 3.04 g (5.88 mmole) of the thus obtained (1,2'-dimethylsilylene)(2,1'-dimethylsilylene)bis(3-trimethylsilylmethylindene) and 50 mL of ether were placed in a Schlenk's bottle under a nitrogen flow. The contents of the bottle were then cooled to −78° C., to which a hexane solution of n-BuLi (1.54 mole/L, 7.6 mL (1.7 mmole)) was added dropwise. The resultant mixture was heated to room temperature and then the mixture was stirred at room temperature for 12 hours. Then, the ether was distilled off to leave a solid. The solid was washed with 40 mL of hexane to obtain 3.06 g (5.07 mmole) of a lithium salt in the form of an ether adduct (yield: 73%). The results of $^1$H-NMR (90 MHz, THF-d$_8$) measurement of the obtained product were as follows:

δ: 0.04 (s, 18H, trimethylsilyl); 0.48 (s, 12H, dimethylsilylene); 1.10 (t, 6H, methyl); 2.59 (s, 4H, methylene); 3.38 (q, 4H, methylene); 6.2 to 7.7 (m, 8H, Ar—H)

The thus obtained lithium salt was dissolved in 50 mL of toluene under a nitrogen flow. This was cooled to −78° C., to which a suspension of 1.2 g (5.1 mmole) of zirconium tetrachloride in 20 mL of toluene, previously cooled to −78° C., was added dropwise. After completion of the dropping, the resultant mixture was stirred at room temperature for 6 hours. The reaction solution was then distilled to remove the solvent therefrom to leave a residue. The residue was recrystallized from dichloromethane to obtain 0.9 g (1.33 mmole) of (1,2'-dimethylsilylene)(2,1'-dimethylsilylene)-bis(3-trimethylsilylmethylindenyl)zirconium dichloride (yield: 26%).

The results of $^1$H-NMR (90 MHz, CDCl$_3$) measurement of the obtained product were as follows:

δ: 0.0 (s, 18H, trimethylsilyl); 1.02, 1.12 (s, 12H, dimethylsilylene); 2.51 (dd, 4H, methylene); 7.1 to 7.6 (m, 8H, Ar—H)

Preparation Example 2

Production of Propylene Polymer

In an autoclave having an inside volume of 1 L, 400 mL of heptane and 0.15 mL (2 mole/L, 0.3 mmole) of triisobutylaluminum were charged under a nitrogen flow, to which hydrogen of 0.25 MPa and propylene were introduced so that the total pressure of 0.8 MPa was reached. After the contents in the autoclave were heated to 70° C. with stirring, 0.08 mL ((10 μmole/mL) of a toluene solution of (1,2'-dimethylsilylene) (2,1'-dimethylsilylene)-bis(3-trimethylsilylmethylindenyl)zirconium dichloride and 0.20 ml (20 μmole/ml) of a slurry of dimethylanilinium tetrakis(pentafluorophenyl) borate in heptane were added thereto. The mixture was then polymerized for 30 minutes. After completion of the polymerization, the pressure within the autoclave was released and the reaction product was poured in 2 L of methanol to obtain 154 g of a propylene polymer. The obtained polymer had a mesopentad fraction [mmmm] of 42 mole %, [rrrr]/(1−[mmmm]) of 0.04, ([mm]×[rr])/[mr]$^2$ of 1.2, [rmrm] of 3.2 mole % and an intrinsic viscosity [η] of 0.35 dl/g. The intrinsic viscosity [η] was measured at 135° C. in a tetralin solvent using an automatic viscometer Model VMR-053 available from Rigosha Co., Ltd.

Preparation Example 3

Preparation of Butene Polymer

In an autoclave having an inside volume of 1 L previously heated to dry were charged 200 mL of heptane, 200 mL of 1-butene and 0.5 mmole of triisobutylaluminum, to which 0.05 MPa of hydrogen was introduced. After the temperature was raised to 70° C. with stirring, 0.8 μmole of (1,2'-dimethylsilylene)(2,1'-dimethylsilylene)-bis(3-trimethylsilylmethylindenyl)zirconium dichloride and 3.2 μmole of dimethylaluminum tetrakis(pentafluorophenyl) borate were added to the autoclave. The mixture was then polymerized for 60 minutes. After completion of the polymerization reaction, the reaction product was dried under a reduced pressure to obtain 85 g of a 1-butene polymer. The obtained 1-butene polymer had mesopentad fraction [mmmm] of 71.6 mole %, [mmmm]/([mmrr]+[rmmr]) of 9, a value of 90−2×[rr] of 81.8 and a weight average molecular weight (Mw) of 66,000.

Example 1

In a beaker having an inside volume of 100 mL, 5.4 g of the propylene polymer prepared in Preparation Example 2 and 50 mL (34 g) of heptane were placed. The beaker was heated at 60° C. in a water bath to completely dissolve the polymer. Separately, 100 g of ion-exchanged water, 0.16 g of sodium dodecylbenzenesulfonate and 0.06 g of sodium polyacrylate were placed in a beaker having an inside volume of 300 mL, and the beaker was heated at 60° C. in a water bath to completely dissolve the sodium dodecylbenzenesulfonate and sodium polyacrylate. To the above heptane solution of the propylene polymer were added 20 ml (20 g) of the thus obtained aqueous solution. The mixture was stirred at 13,500 rpm for 1 minute using a homogenizer (DI25 manufactured by IKA Japan K. K.) to obtain a water dispersible composition. The water dispersible composition was allowed to stand for 10 days and then observed. It was found that no aggregates were observed and that the composition had excellent storage stability.

Example 2

In a beaker having an inside volume of 100 mL, 15.0 g of the butene polymer prepared in Preparation Example 3 and 3 mL (2.0 g) of heptane were placed. The beaker was heated at 60° C. in a water bath to completely dissolve the polymer. Separately, 100 g of ion-exchanged water, 0.16 g of sodium dodecylbenzenesulfonate and 0.06 g of sodium polyacrylate were placed in a beaker having an inside volume of 300 mL, and the beaker was heated at 60° C. in a water bath to completely dissolve the sodium dodecylbenzenesulfonate and sodium polyacrylate. To the above heptane solution of the butene polymer were added 35 ml (35 g) of the thus obtained aqueous solution. The mixture was stirred at 13,500 rpm for 1 minute using a homogenizer (DI25 manufactured by IKA Japan K. K.) to obtain a water dispersible composition. The water dispersible composition was allowed to stand for 10 days and then observed. It was found that no aggregates were observed and that the composition had excellent storage stability.

INDUSTRIAL APPLICABILITY

The water dispersible polyolefin resin composition of the present invention, which contains a low crystalline polyolefin resin dispersed in water in the form of fine particulates, may be used for application onto a surface of a plastic, paper, metal or the like substrate using a generally employed coater, printer or spray method. Although the water dispersible polyolefin resin composition of the present invention contains a water-insoluble organic solvent as an essential component, a load to the operators and environment is reduced, since the organic solvent forms, together with the low crystalline polyolefin resin, fine particulates dispersed in an aqueous medium to form a dispersion.

The invention claimed is:

1. A water dispersible polyolefin resin composition comprising:
   a combination of 5 to 70% by mass of (A) a poly(1-butene) resin having
   (i) a mesopentad fraction [mmmm] of 20 to 80 mole % and
   (ii) a weight average molecular weight (Mw) measured by gel permeation chromatography (GPC) of 10,000 to 1,000,000,
   with 95 to 30% by mass of (B) water;
   (C) a surfactant in an amount of 0.01 to 1.00 part by mass per 100 parts by mass of said combination,
   (D) a water-soluble polymeric compound in an amount of 0.01 to 1.00 part by mass per 100 parts by mass of said combination; and
   (E) a water-insoluble organic solvent in an amount of 2 to 200 parts by mass per 100 parts by mass of said combination;
   wherein the poly(1-butene) resin is a 1-butene homopolymer or a 1-butene copolymer of 1-butene with at least one of ethylene and a $C_{3-20}$ α-olefin other than 1-butene, said copolymer having at least 90 mol % of structural units derived from 1-butene.

2. A water dispersible polyolefin resin composition comprising:
   a combination of 5 to 70% by mass of (A') a polypropylene resin having
   (i) a mesopentad fraction [mmmm] of 20 to 60 mole %,
   (ii) an intrinsic viscosity [η] measured at 135° C. in tetralin of 0.1 to 15 dl/g,
   (iii) a racemic pentad fraction [rrrr] satisfying [rrrr]/(1−[mmmm])≦0.1,
   (iv) a mesotriad fraction [mm] and racemic triad fractions [rr] and [mr] satisfying ([mm]×[rr])/[mr]²≦2.0, and
   (v) a racemic triad fraction [rmrm] of greater than 2.5 mole %,
   with 95 to 30% by mass of (B) water;
   (C) a surfactant in an amount of 0.01 to 1.00 part by mass per 100 parts by mass of said combination,
   (D) a water-soluble polymeric compound in an amount of 0.01 to 1.00 part by mass per 100 parts by mass of said combination, and
   (E) a water-insoluble organic solvent in an amount of 2 to 200 parts by mass per 100 parts by mass of said combination.

3. A water dispersible polyolefin resin composition as defined in claim 1, wherein said composition is obtained by mixing a blend (I) of the component (A) and the component (E) with a blend (II) of the component (B), the component (C) and the component (D).

4. A water dispersible polyolefin resin composition as defined in claim 3, wherein said mixing of the blend (I) with the blend (II) is carried out at a temperature in the range of from 0 to 90° C.

5. A water dispersible polyolefin resin composition as defined in claim 2, wherein said composition is obtained by mixing a blend (I') of the component (A') and the component (E) with a blend (II) of the component (B), the component (C) and the component (D).

6. A water dispersible polyolefin resin composition as defined in claim 5, wherein said mixing of the blend (I') with the blend (II) is carried out at a temperature in the range of from 0 to 90° C.

7. The water dispersible polyolefin resin composition according to claim 1, wherein the poly(1-butene) resin is a 1-butene homopolymer or a 1-butene copolymer of 1-butene with at least one of ethylene and a $C_{3-20}$ α-olefin other than 1-butene, said copolymer having at least 95 mol % of structural units derived from 1-butene.

8. The water dispersible polyolefin resin composition according to claim 1, wherein the poly(1-butene) resin is a 1-butene homopolymer or a 1-butene copolymer of 1-butene and a $C_{3-20}$ α-olefin other than 1-butene.

* * * * *